United States Patent [19]
Münch

[11] Patent Number: 5,228,550
[45] Date of Patent: Jul. 20, 1993

[54] ARRANGEMENT FOR CONVERTING A CALLED-FOR MULTI-TRACK, DENSELY PACKED CONTAINER STREAM INTO A PLURALITY OF PARALLEL CONTAINER ROWS SEPARATED FROM ONE ANOTHER BY SEPARATING ELEMENTS

[75] Inventor: Karl Münch, Heppenheim, Fed. Rep. of Germany

[73] Assignee: Seitz Enzinger Noll Maschinenbau Aktiengesellschaft, Mannheim, Fed. Rep. of Germany

[21] Appl. No.: 874,061

[22] Filed: Apr. 24, 1992

[30] Foreign Application Priority Data

May 7, 1991 [DE] Fed. Rep. of Germany ....... 4114875

[51] Int. Cl.⁵ ................................................ B65G 47/12
[52] U.S. Cl. ...................................... 198/447; 198/452; 198/453
[58] Field of Search ............... 198/445, 446, 453, 454, 198/458, 452

[56] References Cited

U.S. PATENT DOCUMENTS

| 3,444,980 | 5/1969 | Wiseman | 198/445 |
| 3,739,901 | 6/1973 | Crispe | 198/452 |
| 3,767,027 | 10/1973 | Pund et al. | 198/453 |
| 3,862,680 | 1/1975 | Johnson | 198/454 |
| 4,834,605 | 5/1989 | Jerred | 198/458 |
| 4,844,234 | 7/1989 | Born et al. | 198/458 |

FOREIGN PATENT DOCUMENTS

| 2743885 | 4/1979 | Fed. Rep. of Germany | 198/452 |
| 3823228 | 1/1990 | Fed. Rep. of Germany | 198/445 |

Primary Examiner—Joseph E. Valenza
Attorney, Agent, or Firm—Robert W. Becker & Associates

[57] ABSTRACT

An arrangement for converting a multi-track container stream supplied by a feed mechanism into a plurality of parallel container rows in a withdrawal mechanism. The container rows are separated from one another by a lane separation or separating elements. A transition zone is provided between the feed mechanism and the withdrawal mechanism. To increase the output and/or to provide a protective processing of the containers, a lane separation formed by lanes is already provided at the transition zone. In particular, the width of each lane in the transition zone has a conveying width that corresponds to a multi-track container stream yet is several times less than the conveying width of the feed mechanism. Furthermore, the lanes of the transition zone narrow in a direction toward the withdrawal mechanism.

29 Claims, 4 Drawing Sheets

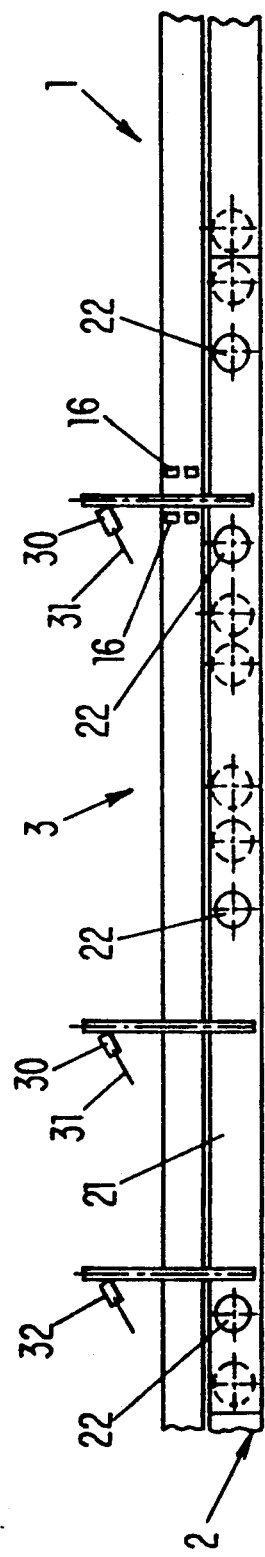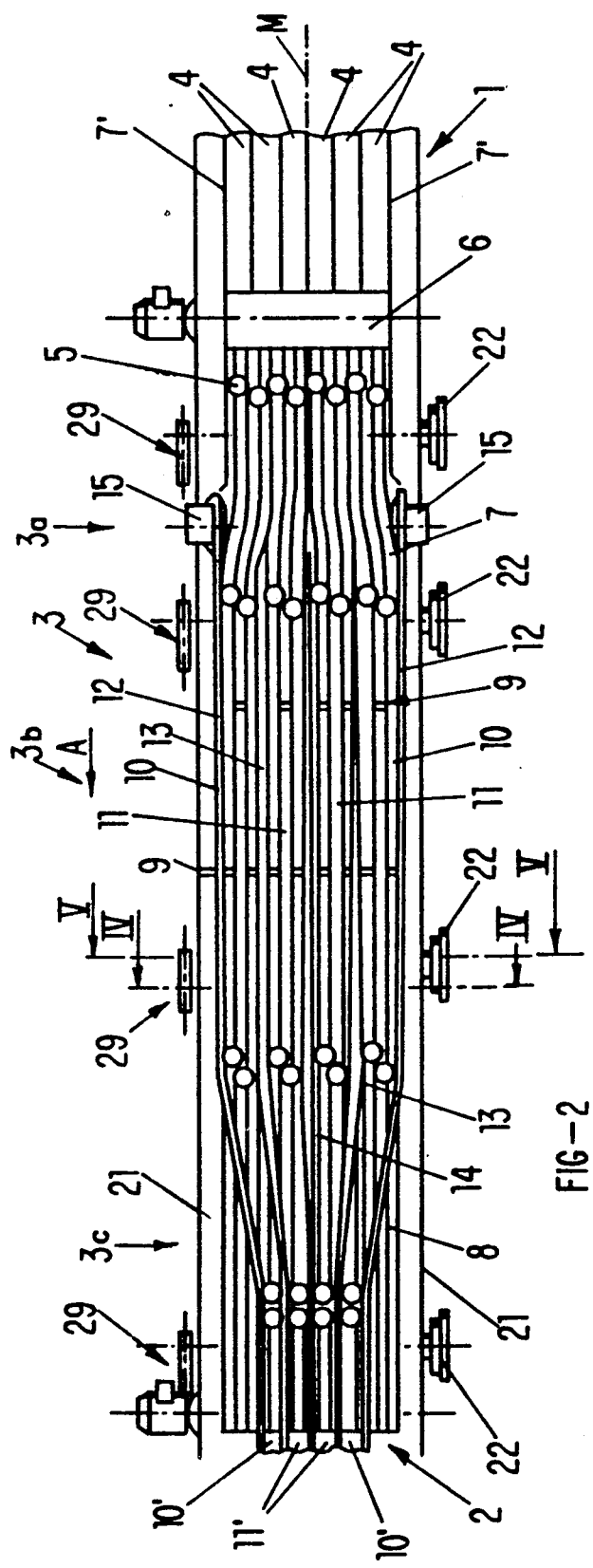

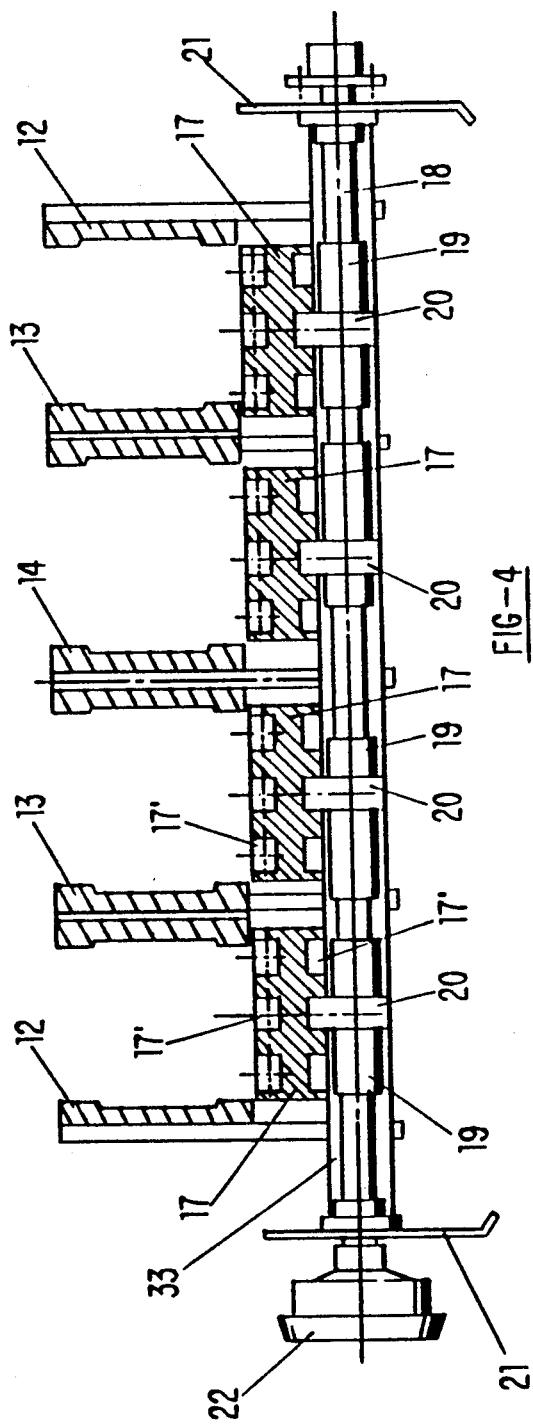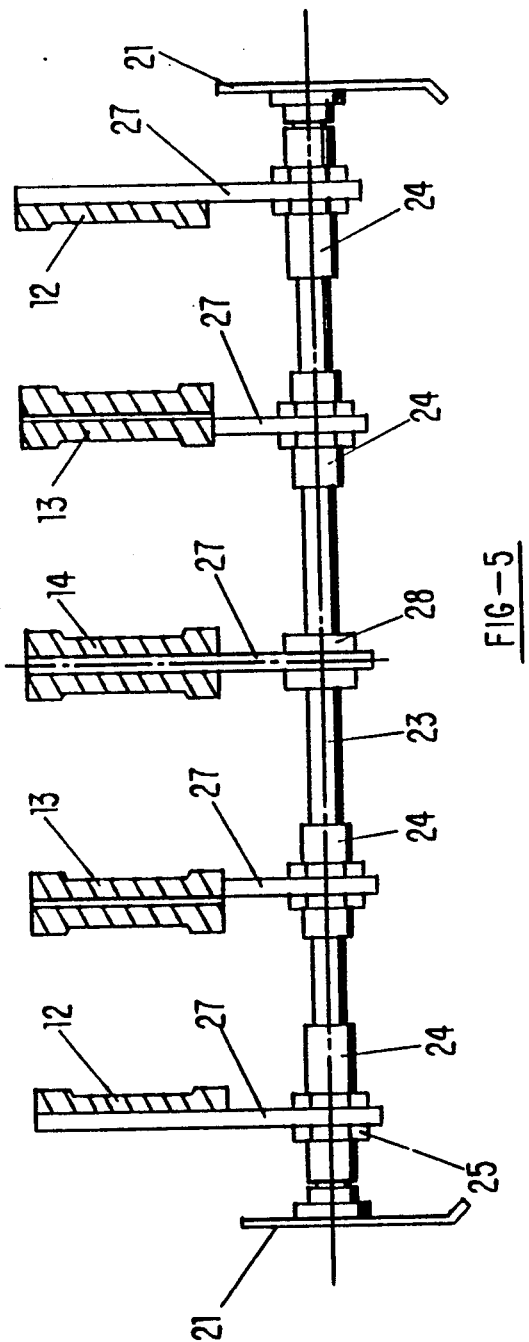

ARRANGEMENT FOR CONVERTING A CALLED-FOR MULTI-TRACK, DENSELY PACKED CONTAINER STREAM INTO A PLURALITY OF PARALLEL CONTAINER ROWS SEPARATED FROM ONE ANOTHER BY SEPARATING ELEMENTS

BACKGROUND OF THE INVENTION

The present invention relates to an arrangement for converting a called-for multi-track, densely packed stream of containers into a plurality of parallel container rows that are separated from one another by separating elements. The arrangement includes a feed mechanism that serves to supply the containers and is formed from at least one conveyor band means. The arrangement also has a withdrawal mechanism that, via separating elements that extend in the conveying direction, is divided into a plurality of lanes, each of which serves to accommodate a respective container row. The arrangement furthermore has a transition zone with an entry region that adjoins the feed mechanism and with an exit region that opens into the withdrawal mechanism. The transition zone is formed from the upper runs of a plurality of conveyor band means, with the upper runs being disposed in the conveying direction and with the conveyor band means being disposed adjacent one another when viewed transverse to the conveying direction. These conveyor band means diverge in a fan-shaped manner in the entry region to distribute the supplied stream of containers to the individual lanes.

In the context of the present invention, the phrase "multi-track, densely packed stream of containers" means a stream of containers in which the containers are actually tightly packed in a plurality of tracks or rows, i.e. their peripheral surfaces rest against one another, or at least as a result of the construction of the transport means that convey this stream of containers, the possibility exists that the peripheral surfaces even of containers of different rows or tracks directly contact one another. In such a multi-track and densely packed stream of containers, the containers then have a honeycombed formation. This refers to a formation or arrangement in which the containers of respective adjacent rows or tracks are offset relative to one another by half of the diameter of the containers, i.e. in a direction transverse to the conveying direction, the containers form "short transverse rows" that form an angle of about 60° with the conveying direction.

In the context of the present invention, "container rows that are separated from one another" refers to container rows that extend in the conveying direction, with the containers of each row being respectively accommodated by a lane, with the containers of a given lane being separated from the containers of an adjacent lane by separating elements, which can be formed, for example, by guide railings.

An arrangement of the aforementioned general type is known from U.S. Pat. No. 4,844,234, and serves in particular to form, from a supplied stream of containers, the container rows required for a container packing machine. Unfortunately, this known arrangement has the drawback that the maximum capacity (number of converted containers per unit of time) that can be achieved therewith is often inadequate. This limitation of the output is due in particular to the very high conveying speed or speed of the conveyor belts, also at the entry region of the transition zone, at high outputs, in other words due to the fact that at high conveying speeds, a high collision speed of the containers results at the separating elements that are provided for the lane separation, and above a certain output or capacity this collision speed leads to destruction of the containers, or at least to disruptions of the container flow.

It is therefore an object of the present invention to improve an arrangement of the aforementioned general type in such a way that it is possible to provide a conversion at increased capacities in an impact-free and pressure-free manner.

BRIEF DESCRIPTION OF THE DRAWINGS

This object, and other objects and advantages of the present invention, will appear more clearly from the following specification in conjunction with the accompanying schematic drawings, in which:

FIG. 1 is a simplified side view of one exemplary embodiment of the inventive arrangement;

FIG. 2 is a plan vie w of the arrangement of FIG. 1, and shows a few of the containers that form the called-for container stream and container rows;

FIG. 4 is a cross-sectional view taken along the line IV—IV in FIG. 2;

FIG. 5 is a cross-sectional view taken along the line V—V in FIG. 2;

SUMMARY OF THE INVENTION

Figure 3:
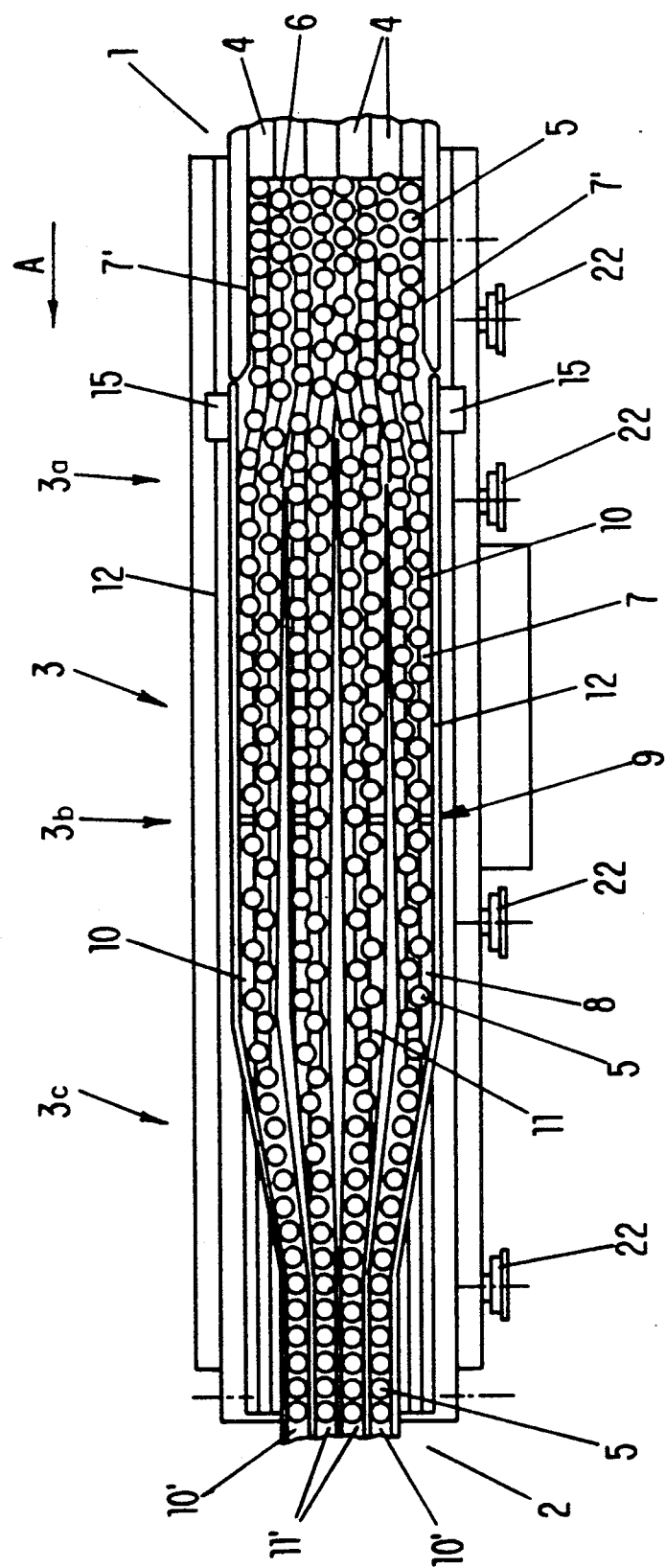
FIG. 3 is a view similar to FIG. 2, but shows a plurality of containers.
Figure 7:
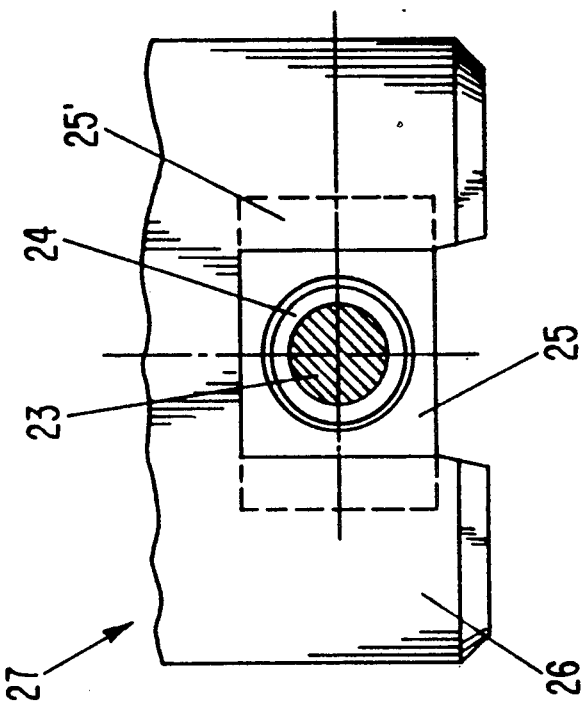
FIG. 7 is a cross-sectional view taken along the line VII—VII in FIG. 6.
Figure 6:
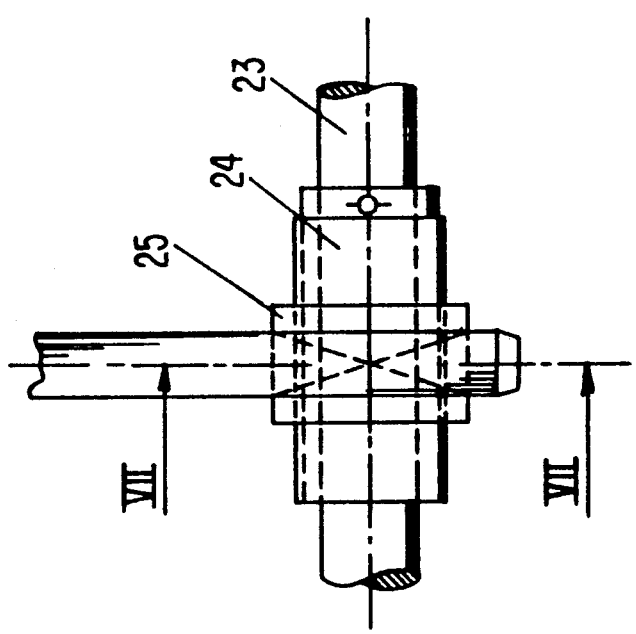
FIG. 6 is an enlarged view of an adjusting element for a guide railing of the inventive arrangement.

The arrangement of the present invention is characterized primarily in that the transition zone, in a central region that adjoins the entry region and is upstream of the exit region, is already provided with a lane separation in the form of a plurality of lanes that are separated from one another by separating elements, with each of these lanes having a conveying width that corresponds to a multi-track container stream yet is several times less than a conveying width of the feed mechanism; each lane of the transition zone, accompanied by a narrowing of its width, communicates with a respective one of the lanes of the withdrawal mechanism: and at least the conveyor band means that form the exit region of the transition zone, as well as the at least one conveyor band means that form the withdrawal mechanism, can be operated at a speed that is greater than the conveying speed of the feed mechanism, i.e., is greater than the speed of the at least one conveyor band means of the feed mechanism.

With the inventive arrangement, the conversion of the called-for stream of containers is effected in stages; in other words, by means of the lane separation that is already provided at the transition zone, from the multi-track, densely packed stream of containers there is first formed a plurality of similarly multi-track container streams that are, however, separated from one another. The width or number of rows or tracks of these separated container streams is less than the conveying width, i.e. the number of rows or tracks, of the called-for container stream. The containers of the separated, multi-track container streams are then combined in an exit region of the transition zone to form respective single container rows. As a consequence of this staged conversion, where the number of container rows of the multi-track, called-for container stream is greater than the number of separated container rows at the withdrawal mechanism, at the same capacity of the arrangement the conveying speed at the entry region can be considerably less than was the case with the state of the art, so that it is possible to achieve an improved conversion that is impact free and pressure free. However, with the same conveying speed at the entry region of the transition zone, it is possible to have a considerably greater output than was possible with the state of the art.

Another decisive factor with the inventive arrangement is that due to the staged conversion, with respect to the collision regions, namely those free ends of the separating elements that are disposed in the container stream, which are particularly critical for the collision of the containers and for the disruptions in operation that can result therefrom, the number of these collision regions relative to the number of container rows of the called-for container stream is greatly reduced. For example, whereas with the state of the art for "n" rows of the called-for container stream, the number of these collision regions is equal to $n-1$, with the present invention the number of collision regions is many times less, i.e. is equal to $(n/n')-1$. In this connection, "n" is again the number of container rows in the called-for container stream, and "n'" is the number of possible container rows in each separated container row of a lane of the transition zone.

Further specific features of the present invention will be described in detail subsequently.

DESCRIPTION OF PREFERRED EMBODIMENTS

Referring now to the drawings in detail, the exemplary embodiment of the inventive arrangement that is illustrated in the drawings essentially comprises a feed mechanism 1, a withdrawal mechanism 2, as well as a transition zone 3 that in the conveying direction A follows or is downstream of the feed mechanism 1, and is upstream of the withdrawal mechanism 2.

The feed mechanism 1 essentially comprises a plurality of conveyor belts or jointed band chains 4 that are each continuous and are driven in an endless circulating manner. The upper lengths or runs of the belts or band chains 4 extend in the conveying direction A and, when viewed transverse to this conveying direction A, are disposed next to one another in a directly abutting manner. Thus, the upper runs of the band chains 4 form an essentially horizontal support or transport surface for the containers 5, which in this case are upright bottles.

Provided at the transition between the feed mechanism 1 and the transition zone 3 is a driven guide means for the band chains 4; also provided is a back-up or slide plate 6 that is disposed at approximately the same level as the transport plane of the feed mechanism 1 and the subsequent transition zone 3. In a direction transverse to the conveying direction A, each side of the feed mechanism 1 is delimited by a guide railing 7'. Each guide railing 7' extends in the conveying direction A beyond the slide plate 6 and into an entry region 3a of the transition zone 3 that follows the slide plate 6. In the transition zone 3, the support or transport surface for the containers 5 is again essentially horizontal and is formed by the upper runs of jointed band chains 7 and 8. In this connection, in the central region 3b of the transition zone 3, when viewed in the conveying direction A a band chain 7 is respectively followed by a band chain 8.

The band chains 7, which essentially form the entry region 3a of the transition zone 3, and the band chains 8, which essentially form the exit region 3c of the transition zone 3 and extend to the transition to the withdrawal mechanism 2, are driven in a circulating manner. In particular, the band chains 7 are driven at a speed that is somewhat greater than the speed of the band chains 4, while the band chains S are driven at a speed that is about twice as great as the speed of the band chains 7, and is also somewhat greater than the speed of the band chains of the withdrawal mechanism 2, i.e. the transport speed of the withdrawal mechanism 2. In the illustrated embodiment, the relationship of the speeds of the band chains 7 and 8 relative to one another are fixedly determined by gearing arrangements. The drive for the band chains 7 and 8 is effected by a motor, the speed of which can be controlled as a function of the capacity of a container-packing machine that is disposed downstream of the inventive conversion arrangement.

If the speed of the band chains 4, i.e. if the transport speed of the feed mechanism 1, is for example approximately 0.18 m/s, the speed of the band chains 7 would be about 0.2 m/s and the speed of the band chains 8 would be about 0.4 m/s, with the transport speed of the withdrawal mechanism 2 being about 0.34 m/s.

As shown in FIG. 2, when viewed in the conveying direction A the abutment regions 9 between respective band chains 7 and 8 are offset from one another, and in particular in such a way that when viewed transverse to the conveying direction A, each abutment region 9 is adjacent to a continuous band chain 7 or 8.

In the illustrated embodiment, when viewed transverse to the conveying direction A, twelve band chains 7 and 8 are respectively provided next to one another and form four groups, each with a total of three band chains 7 and/or 8 that, when viewed in a direction transverse to the conveying direction A, are disposed next to one another. At the entry region 3a, the groups that there are formed exclusively by the band chains 7 diverge in a fan-shaped manner, and in particular in a mirror-symmetrical manner relative to a vertical central plane M that includes the conveying direction A. Following the entry region 3a, the transition zone 3 forms a total of four lanes 10 and 11 with the outer lanes 10 being delimited toward the outside by guide railings 12 and being separated toward the inside, i.e. in the direction toward the adjacent lanes 11, by guide railings 13. A guide railing 14 that essentially extends in the central plane M is provided for separating the two inner lanes 11. As shown in FIGS. 4 and 5, each of the guide railings 13 and 14 is effective toward both sides. The two guide railings 12, the spacing of which is greater than the spacing of the guide railings 7', follow the latter. Provided at the transition between the guide railings 7' and the guide railings 12 is a respective build-up switch or controller 15.

When viewed in the conveying direction A, the guide railings 13 and 14 have upstream ends that are disposed in the entry region 3a, with the central guide railing 14 extending further into this entry region. Each of these upstream ends of the guide railings 13 and 14 are provided with rollers 16 (FIG. 1) that are freely rotatable about horizontal axes. The purpose of the rollers 16 is to reduce the effect of impacts of the containers 5 against the upstream ends of the guide railings 13 and 14, and to facilitate the introduction of the containers 5 into the lanes 10 and 11. In the central region 3b, the guide railings 12, 13 and 14 extend essentially parallel to one another in the conveying direction A.

In the exit region 3c, the guide railings 12 and 13 are guided inwardly at an angle to the conveying direction A, so that in this region the initially relatively wide lanes 10 and 11 taper down to the narrower lanes 10' and 11', which form the lanes of the withdrawal mechanism 2 and the width of each of which essentially corresponds to a single-track stream of containers, i.e. is essentially the same or slightly greater than the diameter of the containers 5.

As shown in FIGS. 2 and 3, the containers 5 are supplied via the feed mechanism 1 as a densely packed, multi-track stream of containers, i.e. in the illustrated embodiment as an 8-track stream of containers. In this container stream, at least at the end of the feed mechanism 1, not only do the peripheral surfaces of the containers 5 rest directly against one another, but the containers are also offset relative to one another in a honeycombed manner in such a way that each container 5 of a given row or track of the multi-track stream of containers is offset relative to the containers of an adjacent row of this container stream by an amount equal to half of the diameter of the containers. The back-up or slide plate 6 guarantees this honeycombed arrangement or formation of the containers 5 at least at the end of the feed mechanism 1 since the containers 5 that are standing on the slide plate 6 are not conveyed or shifted ahead until more containers come up behind them.

Since the band chains 7 rotate at a somewhat greater speed than do the band chains 4, the containers 5, after they pass the slide plate 6, form a separated or loosened-up stream of containers at the beginning of the entry region 3a; however, the formation of this container stream can still be influenced by the shape of the downstream edge (as viewed in the conveying direction A) of the slide plate 6. Due to the fan-shaped pattern of the band chain groups formed by the band chains 7 at the entry region 3a, the stream of containers is also moved apart in a direction transverse to the conveying direction A, in other words, short transverse rows, each containing two containers 5, are formed in which the two containers are spaced from one another in the conveying direction A and are disposed next to one another such that a center to center line extends at an angle to the conveying direction A, i.e. at an angle of about 60° to the conveying direction. Due to the path of the band chains 7, the outer transverse rows, which are respectively formed from two containers 5 and extend at an angle to the conveying direction A, are introduced in a smooth manner into the outer lanes 10 while the inner transverse rows are smoothly introduced into the inner lanes 11, so that in each lane 10 or 11 a separated, initially duel-track container stream results in which the containers 5 of the original honeycombed formation are correspondingly offset from row to row. Due to the speed of the band chains 8, which is greater than the speed of the band chains 7, there then results in the central region 3b an even further separation or loosening-up of these dual-track container streams in the lanes 10 and 11, so that the containers 5 can finally be smoothly combined at the exit region 3c into a total of four parallel rows of containers in the lanes 10' and 11'. The withdrawal mechanism 2, via which the containers 5 can be supplied, for example, to a non-illustrated container packing machine, is formed, for example, from four conveyor belts or jointed band chains and is provided not only with outer guide railings 12 but also inner guide railings 13 and 14 that separate the individual lanes 10' and 11' from one another and form continuations of the guide railings 12, 13 and 14 of the transition zone 3.

To control the stream of containers or bottles, control members 30 are provided at the beginning of the central region 3b, i.e. at the beginning of the lanes 10 and 11, and at the transition to the exit region 3c, i.e. at that location where the lanes 10 and 11 narrow. Each of these control members 30 is provided with a pivotable arm 31, the length of which is such, and which is disposed above the containers 5 that are moving by below the respective control member, in such a way, that each arm 31 is pivoted into a lower position only when two containers 5 that are following one another in the conveying direction A have a greater spacing from one another. Thus, the density of the container stream at the inlet and outlet of the central region 3b is controlled by the control members 30. As a consequence of the signals delivered by these control members 30, especially the feed mechanism 1 is controlled in such a way that the desired container rows with containers 5 that closely follow one another are formed in the lanes 10' and 11' of the withdrawal mechanism 2. Further control members 32, which correspond to the control members 30, are provided at the beginning of the narrower lanes 10' and 11'. These control members 32 monitor the stream of containers in order to determine whether any containers 5 may have fallen over.

The upper runs of the band chains 7 and 8 are guided on rail or bar-like guide elements 17. The upper and lower side of each guide element 17 respectively have three longitudinal slots or grooves 17', with the guide elements 17 resting upon horizontal crosspieces 33 that connect the two frame members 21 to form a frame structure. The three band chains 7 or 8 of a given band chain group are guided in the longitudinal groove 17' on the upper side. Also in the central region 3b the band chains 7 and 8 are guided on guide elements 17, although in this region, at least at the abutment regions 9, the guide elements are interrupted, whereby then in the middle of the central region 3b at the guide elements 17 not only band chains 7 but also band chains 8 are guided. Since the upper and lower sides of the guide elements 17 have a symmetrical configuration, it is possible at the entry region 3a to use the same guide elements 17 not only for the band chains 7 that are fanned out toward the right but also for those that are fanned out toward the left.

In order with one and the same arrangement to be able to process bottles or containers 5 having different diameters, the width of the lanes 10 and 11 can be adjusted. For this purpose, not only the guide elements 17 but also the guide railings 12 and 13 are adjustable perpendicular to the conveying direction A and symmetrical relative to the central plane M. For this purpose, the underside of the guide elements 17 rest upon adjusting spindles 18, the axes of which extend in a horizontal direction at right angles to the conveying direction A; in the vicinity of each guide element 17, the adjusting spindles 18 are provided with respective threaded portions 19. On one side of the central plane M these threaded portions 19 are left-handed threads and on the other side of the central plane M are right-handed threads. Provided on each threaded portion 19 is an internally threaded part 20 that extends into a longitudinal groove 17' on the underside of the pertaining guide elements 17. In the illustrated embodiment, the internally threaded parts 20 are pieces that are provided with a threaded bore and have an essentially rectangular cross-sectional configuration.

The two ends of the adjusting spindles 18 are rotatably mounted in a respective one of the frame members 21 of the frame structure of the inventive arrangement. To adjust the spindle 18, an adjustment wheel 22 having a control dial is provided on one side. In this way, even after a displacement has taken place, it is possible to again find an adjustment that has already proven to be good for a particular container diameter.

With the adjustment elements formed by the adjusting spindles 18 and the threaded portions 19 and internally threaded parts 20, the distance of the individual guide elements 17, and hence the distance of the band chains 7 and 8, from the central plane M can be symmetrically adjusted relative to this central plane, i.e. can be decreased or increased.

To also be able to symmetrically adjust the guide railings 12 and 13 relative to the central plane M, adjusting spindles 23 are provided, with each one being adjacent an adjusting spindle 18 and also having its axis disposed in a horizontal direction and perpendicular to the conveying direction A. The adjusting spindles 23, which also have both ends mounted in a respective frame member 21, are provided with threaded portions 24, with the threaded portions 24 on one side of the central plane M being right-handed threads and those on the other side of the central plane M being embodied as left-handed threads. As was the case with the threaded portions 19, the threaded portions 24 are also preferably formed by threaded sleeves that are disposed and suitably fastened on a shaft that forms the adjusting spindle 23. Again seated on each threaded portion 24 is an internally threaded part 25 that has a parallelepipedal configuration and is provided on two sides that are offset relative to one another in the conveying direction A with a respective groove or slot 25'. Extending into these slots 25' is the fork-shaped lower end 26 of a carrier means 27 of the guide railings 12 and 13. The central guide railing 14 is also provided with vertical carrier means 27 which, however, have the lower fork-shaped ends 26 thereof extending into respective annular grooves in a wider portion 28 of the adjusting spindles 23, so that when the latter is rotated, the central position, i.e. the position in the vicinity of the central plane M, is maintained for the central guide railing 14. Each adjusting spindle 23 is connected via a drive means 29, for example a chain drive, with the pertaining adjusting spindle 18, so that when an adjustment wheel 22 is turned, not only the guide elements 18 and hence the band chains 7 and 8, but also the guide railings 12 and 13 are shifted. By means of the aforementioned mounting of the guide railings 12, 13 and 14 on the adjusting spindles 23, i.e. on the internally threaded parts 25 thereof, it is possible to remove and replace these guide railings 12, 13 and 14 merely by lifting them out.

The present invention is, of course, in no way restricted to the specific disclosure of the specification and drawings, but also encompasses any modifications within the scope of the appended claims.

What I claim is:

1. An arrangement for converting a called-for multi-track, densely packed stream of containers into a plurality of parallel container rows that are separated from one another by separating elements, said arrangement comprising:
   a feed mechanism for supplying said stream of containers in a conveying direction of said arrangement, with said feed mechanism being formed from at least one conveyor band means;
   a withdrawal mechanism that is disposed downstream of said feed mechanism and that via said separating elements, which extend in said conveying direction is divided into a plurality of first lanes, each of which serves to accommodate a respective row of containers, with said withdrawal mechanism being formed from at least one conveyor band means; and
   a transition zone that is disposed between said feed mechanism and said withdrawal mechanism and that has an entry region for receiving containers from said feed mechanism, an exit region for conveying said containers to said withdrawal mechanism, and, between said entry region and said exit region, a central region that is divided into a plurality of second lanes that are separated from one another via said separating elements, with each of these second lanes having a conveying width that corresponds to a multi-track container stream yet is several times less than a conveying width of said feed mechanism, with each of said second lanes of said transition zone, accompanied by a narrowing of said width thereof, communicating with a respective one of said first lanes of said withdrawal mechanism, with said transition zone being formed from upper runs of a plurality of conveyor band means, said upper runs being essentially disposed in said conveying direction, with said conveyor band means of said transition zone being disposed adjacent one another when viewed transverse to said conveying direction and diverging in a fan-shaped manner in said entry region to distribute said stream of containers supplied by said feed mechanism to individual ones of said second lanes of said transition zone, and with at least said conveyor band means of said exit region of said transition zone as well as said at least one conveyor band means of said withdrawal mechanism, being operable at a speed that is greater than a speed of said at least one conveyor band means of said feed mechanism.

2. An arrangement according to claim 1, wherein said conveyor band means of said exit region of said transition zone are operable at a speed that corresponds approximately to the speed of said at least one conveyor band means of said withdrawal mechanism.

3. An arrangement according to claim 1, wherein said conveyor band means of said exit region of said transition zone are operable at a speed that is somewhat greater than the speed of said at least one conveyor band means of said withdrawal mechanism.

4. An arrangement according to claim 1, wherein said conveyor band means of said exit region of said transition zone are operable at a speed that is greater than the speed of said at least one conveyor band means of said feed mechanism by a factor that is approximately equal to the maximum possible number of tracks or container rows in each of said second lanes of said central region of said transition zone.

5. An arrangement according to claim 1, wherein the number of container rows in said called-for, densely packed stream of containers of said feed mechanism is greater than the number of container rows of said withdrawal mechanism by a factor that is equal to the number of maximum possible container rows in each of said second lanes of said central region of said transition zone.

6. An arrangement according to claim 1, wherein said second lanes of said transition zone, in said central region and said exit region thereof, are separated from one another by said separating elements such that all of said second lanes respectively have essentially the same width at any given location along said conveying direction.

7. An arrangement according to claim 1, wherein the number of container rows in said multi-track stream of containers of said feed mechanism is equal to two times the number of container rows of said withdrawal mechanism.

8. An arrangement according to claim 1, wherein said transition zone is formed by at least two groups of said conveyor band means, whereby when viewed in said conveying direction, a conveyor band means of said first group is always followed by a conveyor band means of said second group to form respective abutment regions.

9. An arrangement according to claim 8, wherein said respective abutment regions between said conveyor band means of said first group and said conveyor band means of said second group are offset from one another when viewed in said conveying direction.

10. An arrangement according to claim 9, wherein said abutment regions are approximately disposed in said central region of said transition zone.

11. An arrangement according to claim 8, wherein said conveyor band means of said second group have a greater speed than do said conveyor band means of said first group.

12. An arrangement according to claim 11, wherein said speed of said conveyor band means of said second group is greater than the speed of said conveyor band means of said first group by a factor that is approximately equal to the maximum possible number of tracks or container rows in each of said second lanes of said central region of said transition zone.

13. An arrangement according to claim 12, wherein the speed of said conveyor band means of said second group is approximately twice as great as the speed of said conveyor band means of said first group.

14. An arrangement according to claim 1, wherein said second lanes of said central region of said transition zone extend essentially parallel to one another as well as parallel to a vertical central plane that contains said conveying direction.

15. An arrangement according to claim 14, wherein in said exit region of said transition zone said second lanes thereof narrow to the width of said first lanes of said withdrawal mechanism and come together in a mirror symmetrical manner relative to said central plane.

16. An arrangement according to claim 1, wherein said band means that form said entry region of said transition zone diverge in a fan-shaped manner and in a mirror symmetrical manner relative to a vertical central plane that contains said conveying direction.

17. An arrangement according to claim 1, wherein in the vicinity of where said feed mechanism merges with said transition zone, a back-up or slide plate is provided to ensure a honeycombed formation of said containers of said called for, densely packed stream of containers.

18. An arrangement according to claim 1, wherein the containers in said second lanes of said transition zone have a formation that corresponds to the honeycombed formation of said called-for, densely packed stream of containers.

19. An arrangement according to claim 1, wherein said conveyor band means of said transition zone have a width that is less than the width of said conveyor band means of said feed mechanism and/or said withdrawal mechanism.

20. An arrangement according to claim 1, wherein said conveyor band means of said transition zone form a plurality of groups of conveyor band means that follow one another in said conveying direction, with the number of said groups being equal to the number of said second lanes of said transition zone.

21. An arrangement according to claim 1, wherein at least a part of said transition zone is provided, for said conveyor band means thereof, with guide means and first adjustment means for shifting said guide means transverse to said conveying direction.

22. An arrangement according to claim 21, wherein at least one adjustable guide means is provided for each group of conveyor band means that follows one another in said conveying direction.

23. An arrangement according to claim 21, wherein said first adjustment means comprises at least one adjusting spindle with threaded portions upon which are disposed internally threaded parts that extend into said guide means.

24. An arrangement according to claim 23, wherein said guide means are removable from said internally threaded parts of said first adjustment means.

25. An arrangement according to claim 21, which includes guides for outwardly delimiting outer ones of said first and second lanes; and which includes second adjustment means for shifting, in a direction transverse to said conveying direction, not only said guides but also said separating elements that separate said first and second lanes.

26. An arrangement according to claim 25, wherein said second adjustment means comprises an adjusting spindle with threaded portions and internally threaded parts on which carrier means of said separating elements and said guides are mounted.

27. An arrangement according to claim 26, wherein said carrier means are adapted to be placed upon respective ones of said internally threaded parts from above.

28. An arrangement according to claim 26, wherein a second adjustment means cooperates with each first adjustment means, and wherein a drive means is provided for drivingly interconnecting each cooperating first and second adjustment means.

29. An arrangement according to claim 26, which includes an adjustment wheel that has a control dial for manually adjusting at least one of said first and said second adjustment means.

* * * * *